United States Patent [19]

Brite

[11] Patent Number: 5,279,256

[45] Date of Patent: Jan. 18, 1994

[54] PET FLEA ELIMINATION DEVICE WITH LIGHT AND AIR SOURCES

[76] Inventor: Alan D. Brite, 210 Miramar Ave., Montecito, Calif. 93108

[21] Appl. No.: 24,663

[22] Filed: Mar. 1, 1993

[51] Int. Cl.[5] .................................................. A01K 13/00
[52] U.S. Cl. ........................................ 119/85; 119/159; 132/272; 34/97; 43/141; 43/900
[58] Field of Search ................... 119/156, 159, 83, 85; 132/272; 34/91, 96, 97; 43/124, 125, 129, 132.1, 141, 900

[56] References Cited

U.S. PATENT DOCUMENTS

| | | | |
|---|---|---|---|
| 2,761,055 | 8/1956 | Ike | 43/125 |
| 3,889,693 | 6/1975 | Tanaka et al. | 132/272 |
| 4,166,473 | 9/1979 | Bauer et al. | 132/272 |
| 4,495,958 | 1/1985 | Roeder | 119/83 |
| 4,605,019 | 8/1986 | Reynolds et al. | 132/272 |
| 4,653,433 | 3/1987 | Comparetti | 119/159 |
| 4,779,572 | 10/1988 | Freulon | 119/159 |
| 4,912,750 | 3/1990 | Foster | 362/114 |
| 4,913,172 | 4/1990 | Chou | 132/118 |
| 4,922,859 | 5/1990 | Durell et al. | 119/85 |
| 4,947,802 | 8/1990 | Fisinin et al. | 119/156 |
| 4,958,596 | 9/1990 | Belan | 119/86 |
| 5,115,765 | 5/1992 | El Omary | 119/83 |

*Primary Examiner*—John J. Wilson
*Assistant Examiner*—Todd E. Manahan
*Attorney, Agent, or Firm*—Lyon & Lyon

[57] ABSTRACT

An apparatus for simultaneously inspecting and treating a pet for the presence of unwanted insects by applying an insecticide or ointment directly to a pet's skin, hair, or fur. The apparatus comprises a blower to part the pet's hair or fur, a light to enhance visibility, a detachable pump sprayer to disperse the insecticide or ointment, and tweezers to grip and extract an insect.

10 Claims, 1 Drawing Sheet

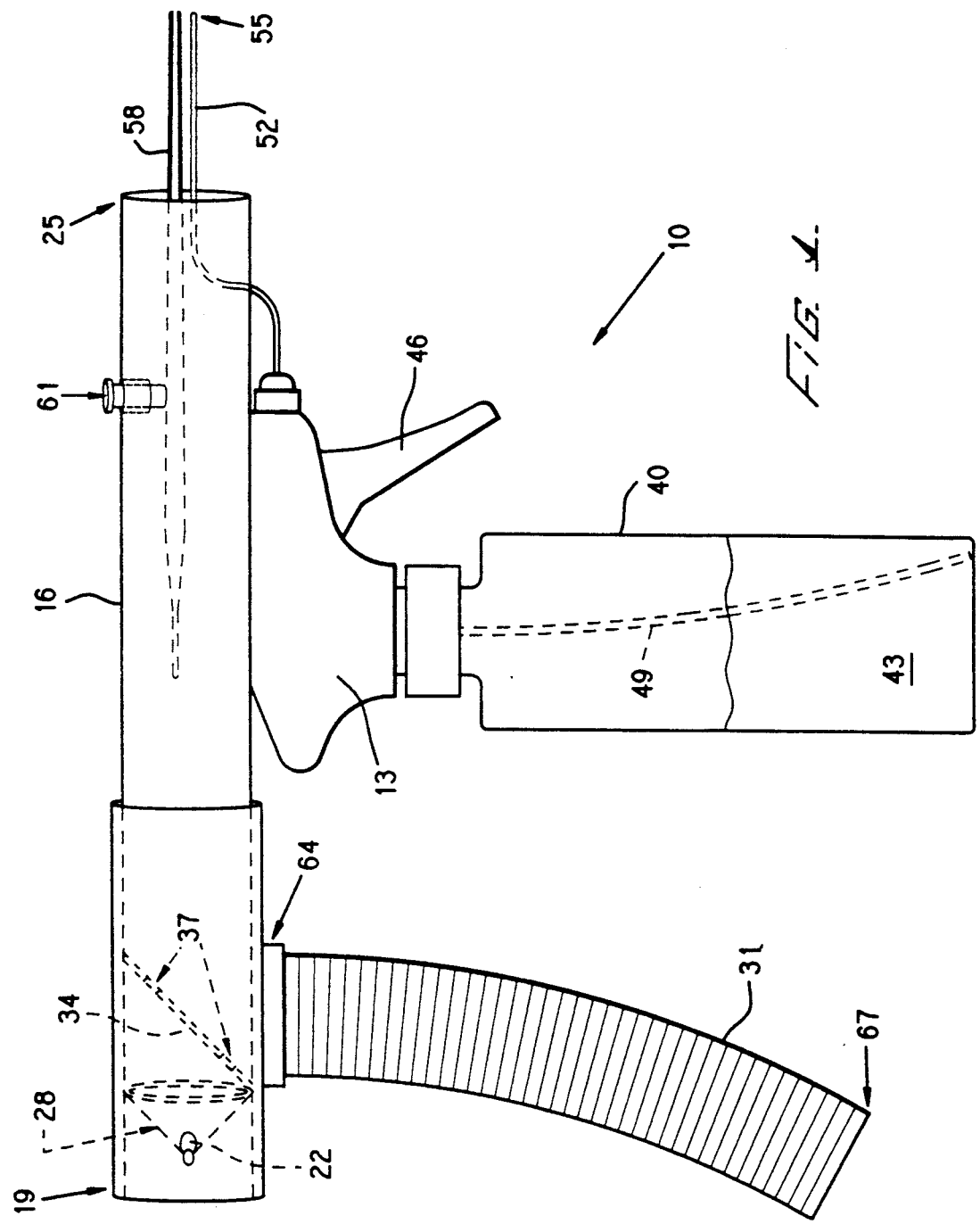

PET FLEA ELIMINATION DEVICE WITH LIGHT AND AIR SOURCES

BACKGROUND OF THE INVENTION a. Field of the Invention

This invention pertains generally to insecticide dispensing devices. More specifically, it relates to devices for applying insecticide directly to an animal's skin, hair, or fur.

b. Background Art

It is well known that a major problem for pet owners is trying to control fleas and ticks on their dogs and cats. Fleas and ticks are tough. It is, therefore, necessary to get the insecticide directly on these insects in order to kill them. The insects, however, sense you are after them and hide in the pet's coat Known devices do not provide a means for parting the pet's coat that works in conjunction with a means for illuminating the hiding insects.

The most common methods used to achieve direct application of the insecticide on the insects are flea and tick baths, and insecticide sprays. If an insecticide bath is used, the entire pet is soaked with the insecticide, which needlessly wastes a great deal of insecticide, unless the pet is entirely covered with fleas or ticks. Similarly, using existing devices for applying insecticide by spot spraying or using an application comb are also ineffective and require the pet owner to waste a substantial amount of insecticide. With these latter methods, the pet owner tries to compensate for the deficiencies in the techniques by saturating the pet. This is the only way to ensure that the insecticide reaches an insect hiding deep within the pet's fur or hair.

Therefore, these prior art methods are costly and time consuming. In addition, using an excessive amount of a toxic insecticide may harm the pet or the person applying the substance.

SUMMARY OF THE INVENTION

The instant invention comprises an apparatus for applying an insecticide or ointment directly to a pet's skin, hair, or fur. This is accomplished by a unique combination of features, preferably including a blower to part the pet's hair or fur, a high-intensity light to enhance visibility, a detachable pump sprayer to disperse the insecticide or ointment, and tweezers to grip and extract an insect. This novel arrangement makes it possible to simultaneously inspect and treat the pet for the presence of unwanted insects.

Accordingly, it is an object of the disclosed invention to provide an improved apparatus for applying insecticides or ointments directly to animals.

A more detailed explanation of the invention is provided in the following description and claims, and is illustrated in the accompanying drawing.

BRIEF DESCRIPTION OF THE DRAWING

FIG. 1 is a side view of an insecticide application apparatus in accordance with a preferred embodiment of the present invention, with some internal features shown in phantom.

DESCRIPTION O THE PREFERRED EMBODIMENT

A further understanding of the present invention may be had by reference to the following description taken in connection with the accompanying drawing. Referring to FIG. 1, a preferred embodiment of an insecticide application apparatus is shown generally at 10. In this preferred embodiment, the application apparatus 10 comprises a pump sprayer 13 attached to the bottom of an airflow outlet tube 16. The remote end 19 of the airflow outlet tube 16 houses a high-intensity lamp 22, which is capable of shining down the airflow outlet tube 16 and illuminating an object at the forward end 25 of the airflow outlet tube 16. A light reflector 28 focuses the light from the high-intensity lamp 22 to maximize the illumination of any object near the forward end 25 of the airflow outlet tube 16.

A first end 64 of an airflow inlet tube 31 is attached to the bottom of the remote end 19 of the airflow outlet tube 16, forward of the light reflector 28. A second end 67 of the airflow inlet tube 31 is attached to an air supply means (not shown), for example, the blower side of a tank vacuum cleaner. In this preferred embodiment, the air supply means is adjustable. This enables the user to control the amount of air being delivered to the pet.

As the air from the airflow inlet tube 31 enters the airflow outlet tube 16, its flow direction is altered by an air deflector 34 and directed toward the forward end 25 of the airflow outlet tube 16. The air deflector 34 has air holes 37 therein to allow a portion of the air to reach the light reflector 28 and the high-intensity light 22 for cooling purposes. In this preferred embodiment, the high-intensity lamp only comes on when the air supply means is operating, which prevents excessive heat buildup in the airflow outlet tube 16.

This preferred embodiment also comprises tweezers 58 mounted on the forward end 25 of the airflow outlet tube 16. The tweezers 58 are operated by pushing compression button 61 for grasping and extracting a tick, for example.

The forward end 25 of the airflow outlet tube 16 is placed near a pet. Therefore, when the air exits the forward end 25 of the airflow outlet tube 16, it parts the pet's hair, making it easy to spot any insects. Fortunately, insects that are being blasted by the air from the outlet tube 16 tend to cling to the pet without moving to avoid being blown away. This facilitates application of the insecticide directly on an insect using the pump sprayer 13 or gripping of the insect with tweezers 58.

The pump sprayer 13 is detachably connected to a reservoir 40. The reservoir 40 contains the substance 43 to be applied to the pet (e.g., insecticide or ointment). Since the reservoir 40 is detachable, it may be readily exchanged for one containing a different substance. When a user pumps the application trigger 46, the substance 43 is drawn up through first sprayer tube 49 and is forced out through second sprayer tube 52. The spray end 55 of second sprayer tube 52 would be placed near a target insect or other location on the pet before the user would pump the application trigger 46. The spray end 55 extends from the forward end 25 of the airflow outlet tube 16 to simplify direct application of the insecticide on the insect.

While what has been described above is a preferred embodiment of this invention, it will be obvious to those skilled in the art that numerous changes may be made without departing from the spirit or scope of the invention. It is intended that all matter contained in the above description or shown in the accompanying drawing shall be interpreted as being illustrative only and not limiting. The invention, therefore, is not to be limited except in accordance with the below claims.

I claim:

1. An insecticide application apparatus comprising
an airflow outlet tube;
an airflow inlet tube attached to a bottom of said airflow outlet tube between a remote end of the airflow outlet tube and a forward end of the airflow outlet tube such that an average direction of airflow changes as the airflow transitions from the airflow inlet tube to the airflow outlet tube; and
a pump sprayer attached to said airflow outlet tube, said pump sprayer being detachably connected to a reservoir containing a substance to be applied to a pet, wherein said substance is drawn through a first sprayer tue and forced out a spray end of a second sprayer tube when an application trigger is pumped.

2. The insecticide application apparatus according to claim further comprising a high-intensity lamp mounted to said airflow outlet tube such that the lamp illuminates an object near the forward end of the air flow outlet tube.

3. The insecticide application apparatus according to claim 2 further comprising an air deflector for deflecting the air toward a forward end of said airflow outlet tube.

4. An insecticide application apparatus comprising
an airflow outlet tube;
a pump sprayer connected to said airflow output tube, wherein said pump sprayer is detachably connected to a reservoir containing a substance to be applied to a pet;
an airflow inlet tube, wherein a first end of said airflow inlet tube is connected to said airflow outlet tube and a second end of said airflow inlet tube is connected to an air supply means; and
a high-intensity lamp mounted in a remote end of said airflow outlet tube, wherein a light reflector directs the light from said high-intensity lamp toward a forward end of said airflow outlet tube.

5. The insecticide application apparatus according to claim 4 wherein tweezers are mounted on said airflow outlet tube and project from said airflow outlet tube, and wherein a compression button is mounted on said airflow outlet tube to operate said tweezers.

6. The insecticide application apparatus according to claim 5 wherein said reservoir is constructed of a transparent material so that the volume of said substance in said reservoir may be easily monitored.

7. An insecticide application apparatus comprising:
an airflow outlet tube;
an airflow inlet tube attached to said airflow outlet tube;
a pump sprayer attached to said airflow outlet tube, said pump sprayer being detachably connected to a reservoir containing a substance to be applied to a pet, wherein said substance is drawn through a first sprayer tube and force out a spray end of a second sprayer tube when an application trigger is pumped; and
tweezers mounted on said airflow outlet tube and projecting from a forward end of said airflow outlet tube.

8. An insecticide application apparatus comprising
an airflow outlet tube;
an airflow inlet tube attached to said airflow outlet tube;
a pump sprayer attached to said airflow outlet tube, said pump sprayer being detachably connected to a reservoir containing a substance to be applied to a pet, wherein said substance is drawn through a first sprayer tube and forced out a spray end of a second sprayer tube when an application trigger is pumped;
a high-intensity lamp mounted to said airflow outlet tube; and
an air deflector for deflecting the air toward a forward end of said airflow outlet tube, wherein said air defector has air holes therein to allow said air from said airflow inlet tube to cool said high-intensity lamp.

9. An insecticide application apparatus comprising
an airflow outlet tube;
an airflow inlet tube attached to said airflow outlet tube;
a pump sprayer attached to said airflow outlet tube, said pump sprayer being detachably connected to a reservoir containing a substance to be applied to a pet, wherein said substance is drawn through a first sprayer tube and forced out a spray end of a second sprayer tue when an application trigger is pumped;
tweezers mounted on said airflow outlet tube and projecting from a forward end of said airflow outlet tube; and
a compression button mounted to said airflow outlet tube for operating said tweezers.

10. An insecticide application apparatus comprising
an airflow outlet tube;
an airflow inlet tube attached to said airflow outlet tube;
a pump sprayer attached to said airflow outlet tube, said pump sprayer being detacably connected to a reservoir containing a substance to be applied to a pet, wherein said substance is drawn through a first sprayer tube and forced out a spray end of a second sprayer tube when an application rigger is pumped;
a high-intensity lamp mounted to said airflow outlet tube; and
a light reflector around said high-intensity lamp for directing the light from said high-intensity lamp toward a forward end of said airflow outlet tube.

* * * * *

UNITED STATES PATENT AND TRADEMARK OFFICE
CERTIFICATE OF CORRECTION

PATENT NO. : 5,279,256
DATED : January 18, 1994
INVENTOR(S) : Alan D. Brite

It is certified that error appears in the above-indentified patent and that said Letters Patent is hereby corrected as shown below:

On column 3, line 14, change "tue" to --tube--.

On column 3, line 18, after "claim" insert --1--.

On column 4, line 1, change "force" to --forced--.

On column 4, line 22, change "defector" to --deflector--.

On column 4, line 34, change "tue" to --tube--.

On column 4, line 50, change "rigger" to --trigger--.

Signed and Sealed this

Twelfth Day of July, 1994

Attest:

BRUCE LEHMAN

*Attesting Officer*     Commissioner of Patents and Trademarks